United States Patent [19]

Nelson et al.

[11] Patent Number: 4,996,246

[45] Date of Patent: Feb. 26, 1991

[54] ENHANCING COLOR STABILITY TO STERILIZING RADIATION OF POLYMER COMPOSITIONS

[75] Inventors: Linda H. Nelson, Evansville, Ind.; Roger W. Avakian, Frilinglei, Belgium; Arnold Factor, Scotia, N.Y.

[73] Assignee: General Electric Company, Pittsfield, Mass.

[21] Appl. No.: 424,431

[22] Filed: Oct. 20, 1989

Related U.S. Application Data

[60] Continuation of Ser. No. 136,607, Dec. 22, 1987, Pat. No. 4,880,853, which is a division of Ser. No. 769,277, Aug. 26, 1985, abandoned, which is a continuation-in-part of Ser. No. 579,103, Feb. 16, 1984, abandoned.

[51] Int. Cl.[5] .............................................. C08K 5/07
[52] U.S. Cl. .................................... 523/136; 521/357
[58] Field of Search ......................... 524/357; 523/136

[56] References Cited

U.S. PATENT DOCUMENTS

| | | |
|---|---|---|
| 2,288,282 | 6/1947 | Huismann . |
| 2,465,319 | 3/1949 | Rex et al. . |
| 2,739,171 | 3/1956 | Linn . |
| 2,901,466 | 8/1959 | Kibler et al. . |
| 2,960,453 | 11/1960 | Cook et al. . |
| 2,999,835 | 9/1961 | Goldberg . |
| 3,028,365 | 4/1962 | Schnell et al. . |
| 3,030,331 | 4/1962 | Goldberg . |
| 3,047,539 | 7/1962 | Pengilly . |
| 3,148,172 | 9/1964 | Fox . |
| 3,153,008 | 10/1964 | Fox . |
| 3,169,121 | 2/1965 | Goldberg . |
| 3,207,814 | 9/1965 | Goldberg . |
| 3,251,807 | 5/1966 | Deanin et al. . |
| 3,259,047 | 6/1966 | Caldwell et al. . |
| 3,264,264 | 8/1966 | Baker . |
| 3,334,154 | 8/1967 | Kim . |
| 3,386,935 | 6/1968 | Jackson, Jr. et al. . |
| 3,475,373 | 10/1969 | Jackson, Jr. et al. . |
| 3,537,967 | 11/1970 | Kelley et al. . |
| 3,622,538 | 11/1971 | Green . |
| 3,940,325 | 2/1976 | Hirao . |
| 4,001,184 | 1/1977 | Scott . |
| 4,018,750 | 4/1977 | Onizawa . |
| 4,069,201 | 6/1977 | Mark . |
| 4,123,436 | 10/1978 | Holub et al. . |
| 4,131,575 | 12/1978 | Adelmann et al. . |
| 4,156,069 | 5/1979 | Prevorsek et al. . |
| 4,184,994 | 1/1980 | Mark et al. .......................... 524/357 |
| 4,194,038 | 3/1980 | Baker et al. . |
| 4,282,134 | 8/1981 | Mark et al. .......................... 524/357 |
| 4,431,497 | 2/1984 | Rekers . |
| 4,880,853 | 11/1989 | Nelson et al. ....................... 523/136 |

FOREIGN PATENT DOCUMENTS

| | | |
|---|---|---|
| 0152012 | 3/1971 | European Pat. Off. . |
| 0296473 | 12/1988 | European Pat. Off. . |
| 55-084352 | 7/1970 | Japan . |
| 442480 | 4/1979 | Japan . |

Primary Examiner—Veronica P. Hoke
Attorney, Agent, or Firm—Spencer D. Conard

[57] ABSTRACT

Compounds having defined functional groups are described which color stablize aromatic carbonate polymers or blends therewith upon exposure to sterilizing radiation.

1 Claim, No Drawings

ENHANCING COLOR STABILITY TO STERILIZING RADIATION OF POLYMER COMPOSITIONS

This is a continuation of co-pending application Ser. No. 07/136,607 filed on Dec. 22, 1987, now U.S. Pat. No. 4,880,853, which is a divisional of Ser. No. 769,277 filed on Aug. 26, 1985, abandoned which is a continuation-in-part of 579,103 filed Feb. 10, 1984, abandoned.

This invention relates to aromatic carbonate polymers and blends containing carbonate polymers rendered resistant to yellowing by sterilizing irradiation. More particularly, this invention relates to aromatic carbonate polymers containing certain additives having functional groups effective to color stabilize such polymers upon exposure to sterilizing radiation.

BACKGROUND OF THE INVENTION

Aromatic carbonate polymers are well known thermoplastic materials which, due to their many advantageous properties, find use as thermoplastic engineering materials. The aromatic carbonate polymers exhibit, for example, excellent properties of toughness, impact resistance, heat resistance and dimensional stability. Not only are molded parts prepared from aromatic carbonate polymers, but films and sheet materials as well. Because of its excellent property spectrum, aromatic carbonate polymers such as aromatic polycarbonate have been proposed for various utilities including those relating to medical packaging, for example the containers in which syringes, surgical instruments, intravenous fluids, operating room devices, and the like are maintained. Additionally polycarbonate has been used in medical devices such as blood oxygenators, anesthesia canisters, intravenous connectors and accessories, blood centrifuge bowls, surgical instruments and operating room instruments. The toughness of the polycarbonate as well as its clarity, high heat resistance, strength and good blood compatibility make it a potential substance of choice in this high technology medical device and packaging market. Sterilization of these articles used in the medical arts and other technologies is often times required.

However, one particular difficulty with certain sterilization techniques has been discovered. A typical method of sterilizing various objects useful in medical practice is through irradiation. The type of radiation usually employed is low level gamma or electron beam radiation. It is readily apparent that the level of such radiation which accomplishes the sterilization is significantly above that of ordinary background radiation. When exposed to radiation which is of sufficient strength and duration to sterilize various objects, the aromatic carbonate polymeric material is subject to yellowing. This yellowing of the aromatic carbonate reduces its clarity and alters its appearance and thereby reduces its utility. Not only packaging materials such as flexible aromatic carbonate film and sheet products but also molded parts as well suffer from this yellowing phenomonon.

New additives have been discovered which inhibit the yellowing of aromatic carbonate polymers after exposure to sterilization irradiation. Thus, particularly in the medical and food industries, the utility of polycarbonate film, sheet, and molded parts may be increased.

DESCRIPTION OF THE INVENTION

Briefly, according to the present invention, there are provided sterilizing radiation color stabilized aromatic carbonate polymers which contain an effective amount of a stabilizing compound effective to inhibit yellowing upon sterilizing radiation exposure, the compound is selected from the group consisting of organic acids (—COOH), esters (—COOR$^3$), alcohols (—OH), thiols, thioethers and cyclic thioethers, anilides (—NHC$_6$H$_5$), amines (—NH$_2$), oxamides (NHCOCONH$_2$), diketones (>CO), sulfones (—SO$_2$—), alkenes (>C=C<), hydroaromatics, and pyranyl compounds.

Aromatic carbonate polymer generally includes both the polycarbonates and the copolyestercarbonates. The aromatic polycarbonate resins for use herein can be prepared by reacting a dihydric phenol with a carbonate precursor, such as phosgene, a haloformate or a carbonate ester. Generally speaking, such carbonate polymers may be typified as possessing recurring structural units of the formula:

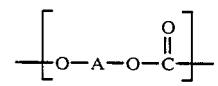

FIG. I wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:
2,2-bis(4-hydroxyphenyl)propane;
hydroquinone;
resorcinol;
2,2-bis-(4-hydroxyphenyl)pentane;
2,4'-dihydroxydiphenylmethane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dihydroxydiphenyl ether; and the like.

Other dihydric phenols which are also suitable for use in the preparation of the above polycarbonates are disclosed in U.S. Pat. Nos. 2,999,835; 3,028,365; 3,334,154; and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and U.S. Pat. Nos. 4,018,750 and 4,123,436, or by transesterification processes such as are disclosed in U.S. Pat. No. 3,153,008, as well as other processes known to those skilled in the art.

It is possible to employ two or more different dihydric phenols or a copolymer of a dihydric phenol with a glycol or with a hydroxy or acid terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184, also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use as component (a) (i) herein is a homopolymer derived from 2,2-bis(4-hydroxyphenyl)propane (bisphenol-A).

The copolyestercarbonate usually employed may generally be described as polymers comprising recurring carbonate groups,

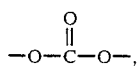

carboxylate groups,

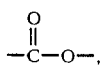

and aromatic carbocyclic groups in the linear polymer chain, in which at least some of the carboxylate groups and at least some of the carbonate groups are bonded directly to ring carbon atoms of the aromatic carboxylic groups. These copolyestercarbonate copolymers in general, are prepared by reacting a difunctional carboxylic acid or ester forming derivative, a dihydric phenol and a carbonate precursor.

The dihydric phenols useful in formulating the copolyestercarbonates for use herein may be represented by the general formula:

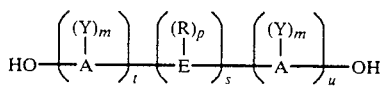

FIG. II.

in which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidine and generally from one to twelve carbon atoms, inclusive, etc. Where E is an alkylene or alkylidene group, it may also consist of two or more alkylene or alkylidene groups, connected by a nonalkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group of five to seven carbon atoms, inclusive (e.g. cyclopentyl, cyclohexyl), or a cycloalkylidene of five to seven carbon atoms inclusive, such as cyclohexylidene, a sulfur containing linkage, such as sulfide, sulfoxide or sulfone; an ether linkage; a carbonyl group; a tertiary nitrogen group, or a silicon containing linkage such as silane or siloxy. Other groups which E may represent will occur to those skilled in the art. R is hydrogen or a monovalent hydrocarbon group such as alkyl of one to eight carbon atoms, inclusive (methyl, ethyl, propyl, etc.), aryl (phenyl, naphthyl, etc.), aralkyl (benzyl, ethylphenyl, etc.) or cycloaliphatic of five to seven carbon atoms, inclusive (cyclopentyl, cyclohexyl, etc.). Y may be an inorganic atom such as chlorine, bromine, fluorine, etc.; an organic group such as the nitro group, etc.; an organic group such as R above, or an oxy group such as OR, it being only necessary that Y be inert to and unaffected by the reactants and the reaction conditions. The letter m is any whole number from and including zero through the number of positions on A available for substitution; p is any whole number from and including zero through the number of available positions on E; t is a whole number equal to at least one, S is either zero or one, and u is any whole number including zero.

In the dihydric phenol compound represented by Formula II above, when more than one Y substituent is present, they may be the same or different. The same is true for the R substituent. Where s is zero in Formula II and u is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship, where two or more ring carbon atoms of the aromatic hydrocarbon residue are substituted with Y and hydroxyl group.

Examples of dihydric phenol compounds that may be employed in the copolyestercarbonate include:
2,2-bis-(4-hydroxyphenyl)propane (bisphenol-A);
2,4'-dihydroxydiphenylmethane;
bis-(2-hydroxyphenyl)methane;
bis-(4-hydroxyphenyl)methane;
bis-(4-hydroxy-5-nitrophenyl)methane;
bis-(4-hydroxy-2,6-dimethyl-3-methoxyphenyl)methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(4-hydroxynaphthyl)propane;
2,2-bis-(4-hydroxyphenyl)pentane;
3,3-bis-(4-hydroxyphenyl)pentane;
2,2-bis-(4-hydroxyphenyl)heptane;
bis-(4-hydroxyphenyl)phenylmethane;
bis-(4-hydroxyphenyl)cyclohexylmethane;
1,2-bis-(4-hydroxyphenyl)-1,2-bis-(phenyl)propane;
2,2-bis-(4-hydroxyphenyl)-1-phenylpropane; and the like.

Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxy-naphthalenes such as 2,6-dihydroxynaphthalene, etc.

Also useful are dihydric phenols wherein E is a sulfur containing radical such as the dihydroxy aryl sulfones exemplified by: bis-(4-hydroxyphenyl)sulfone; 2,4'-dihydroxydiphenyl sulfone; 5-chloro-2,4'-dihydroxy diphenyl sulfone; 3-chloro-bis-(4-hydroxyphenyl) sulfone; and 4,4'-dihydroxytriphenyldisulfone; etc. The preparation of these and other useful sulfones are described in U.S. Pat. No. 2,288,282. Polysulfones as well as substituted sulfones using halogen, nitrogen, alkyl radicals, etc. are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:

4,4'-dihydroxydiphenyl ether;
4,4'-dihydroxytriphenyl ether;
the 4,3'-, 4,2'-, 4,1'-, 2,2'-, 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxy-diphenyl ether, etc.

Mixtures of the dihydric phenols can also be employed and where dihydric phenol is mentioned herein, mixtures of such materials are considered to be included.

In general, any difunctional carboxylic acid or its reactive derivative such as the acid halide conventionally used in the preparation of polyesters may be used for the preparation of polyestercarbonates useful in formulating the compositions of the present invention. In general, the carboxylic acids which may be used include the aliphatic carboxylic acids, aliphatic aromatic carboxylic acids, or aromatic carboxylic acids. The aromatic dicarboxylic acids or their reactive derivatives such as the aromatic diacid halides are preferred as they produce the aromatic polyestercarbonates which are most useful, from the standpoint of physical properties, in the practice of the instant invention.

These carboxylic acids may be represented by the general formula:

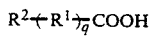  FIG. III.

wherein $R^1$ represents an alkylene, alkylidene or cycloaliphatic group in the same manner as set out above for E in Formula II; an alkylene, alkylidene or cycloaliphatic group containing ethylenic unsaturation; an aromatic radical such as phenylene, naphthylene, bisphenylene, substituted phenylene, etc.; two or more aromatic groups connected through non-aromatic linkages such as those defined by E in Formula II; or a divalent aliphatic aromatic hydrocarbon radical such as an aralkyl or alkaryl radical. $R^2$ is either a carboxyl or a hydroxyl group. The letter q represents the integer one where $R^2$ is a hydroxyl group and either zero or one where $R^2$ is a carboxyl group. Thus the difunctional carboxylic acid will either be a monohydroxy monocarboxylic acid or a dicarboxylic acid. For purposes of the present invention the aromatic dicarboxylic acids or their reactive derivatives such as, for example, the acid halides, are preferred. Thus in these preferred aromatic dicarboxylic acids, as represented by Formula II, $R^2$ is a carboxyl group and $R^1$ is an aromatic radical such as phenylene, biphenylene, naphthylene, substituted phenylene, etc., two or more aromatic groups connected through non-aromatic linkages; or a divalent aliphatic aromatic radical. Some nonlimiting examples of suitable preferred aromatic dicarboxylic acids which may be used in preparing the the copolyestercarbonate resins of the instant invention include phthalic acid, isophthalic acid, terephthalic acid, homophthalic acid, o-, m-, and p-phenylenediacetic acid, the polynuclear aromatic acids such as diphenic acid, and 1,4-naphthalic acid. The aromatics may be substituted with Y groups in the same manner as the formula I aromatics are substituted.

These acids may be used individually or as mixtures of two or more different acids.

The carbonate precursor may be either a carbonyl halide, a carbonate ester, or a haloformate. The carbonyl halides which can be employed herein are carbonyl chlorides and carbonyl bromide. Typical of the carbonate esters which may be employed herein are diphenyl carbonate, di(halophenyl)carbonates such as di(chlorophenyl)carbonate, di(bromophenyl)carbonate, di(trichlorophenyl)carbonate, di(tribromophenyl)carbonate, etc., di(alkylphenyl)carbonates such as di(tolyl) carbonate, etc., di(naphthyl)carbonate, di(chloronaphthyl)carbonate, phenyltolyl carbonate, chloronaphthyl chlorophenyl carbonate, and the like. The haloformates suitable for use herein include bishaloformates of dihydric phenols such as bischloroformates of hydroquinone, etc. or glycols such as bis-haloformates of ethylene glycol, neopentyl glycol, polyethylene glycol, etc. While other carbonate precursors will occur to those skilled in the art, carbonyl chloride, also known as phosgene is preferred.

The preparation of copolyestercarbonates which may be employed in the compositions of the present invention is described in U.S. Pat. Nos. 3,030,331; 3,169, 121; 3,207,814; 4,194,038 and 4,156,069.

The copolyestercarbonates which are preferred in the practice of the present invention include the aromatic polyestercarbonates derived from dihydric phenols, aromatic dicarboxylic acids or their reactive ester forming derivatives such as the aromatic diacid halides, and phosgene. A particularly useful class of aromatic copolyestercarbonates is that derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of ester units in the copolyestercarbonate is generally from about 25 to 90 mole percent and preferably about 35 to 80 mole percent. The molar range of terephthalate units, the remainder of the copolymer ester units preferably comprising isophthalate units is generally from about 2 to 90 percent, and preferably from about 5 to about 25 percent.

The aromatic carbonate polymers are commonly mixed with a second polymer and so on to produce blends having varying physical properties and utility. Generally, the polycarbonate content of such blends can range between 1 to 99 parts by weight to correspondingly 99 to 1 parts by weight, based on 100 weight parts, of aromatic carbonate polymer to second polymer, etc.

Commonly, polyesters are a second polymer. Suitable polyesters may be derived from an aliphatic, aliphatic ether, or cycloaliphatic diol, containing from 2 to about 10 carbon atoms and one or more aromatic or cycloaliphatic dicarboxylic acids.

One preferred polyester is derived from an aliphatic diol and an aromatic dicarboxylic acid. Specific among these are the poly(alkylene terephthalates, i.e. poly(ethylene terephthalate) and poly(butylene terephthalate).

A variation of this first polyester replaces a portion of the aliphatic diol and aromatic dicarboxylic acid with additional amounts of diols and/or diacids in amounts of from 0.5 to 50 weight percent based on the total composition. The additional diacids can be aliphatic or cycloaliphatic with the number of carbon atoms ranging from 2 to 20. Likewise, additional diols can be cycloaliphatic or aliphatic with the number of carbon atoms covering the same range. Polyalkylene ether glycols can also be used where the alkylene portion has from 2 to 10 carbon atoms and the entire glycol portion varies in molecular weight from 100 to 10,000. All such polyesters can be made following the teachings of, for example, U.S. Pat. Nos. 2,465,319 and 3,047,539.

A second preferred polyester is derived from a cycloaliphatic diol and an aromatic or cycloaliphatic dicarboxylic acid. These polyesters may be prepared, for example, by condensing either the cis- or transisomer (or mixtures thereof) of, for example, 1,4-cyclohexanedimethanol with a dicarboxylic acid such as isophthalic and/or terephthalic acid. Examples of additional aromatic dicarboxylic acids are 1,2-di(p-carboxyphenyl)ethane, 4,4'-dicarboxydiphenyl ether, etc., and mixtures of these. Dicarboxylic acids containing fused rings can also be present, such as in 1,4- or 1,5-naphthalenedicarboxylic acids. Also contemplated are cycloaliphatic diacids, such as cyclohexane dicarboxylic acid. However, the preferred dicarboxylic acids are terephthalic acid or a mixture of terephthalic and isophthalic acids.

Still a third polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic or cycloaliphatic dicarboxylic acid. A preferred such polyester may be derived from the reaction of either the cis- or trans-isomer (or mixtures thereof) of 1,4-cyclohexanedimethanol and ethylene glycol with terephthalic acid in a molar ratio of, for example, 80:20: 100.

The polyesters employed in the practice of the invention will usually have an intrinsic viscosity of from about 0.4 to about 2.0 dl/g., as measured in a 60:40 phenol:tetrachloroethane mixture, or similar solvent at 23°–30° C. Such polyesters may be prepared according to U.S. Pat. No. 2,901,466.

The aromatic carbonate polymers may be blended with other polymers as well. Illustrative of these polymer types include acrylates, polyolefins, EDPM type polymers, styrenics, butadiene, poly(phenylene-ether), poly(ether-imide), polysulfone, polyarylates, and the like.

Various other additives may be employed in their appropriate quantities if they do not substantially detract from the final application. For example, the composition can be thermally stabilized by a phosphite, hydrolytically stabilized by an epoxide, reinforced with glass fiber, flame retarded with a salt or brominated polymer, or colorants.

Ester compounds useful as stabilizers herein have functional groups represented by ($-COOR^3$) wherein $R^3$ may be a substituted or unsubstituted, aromatic or aliphatic, hydrocarbon and the parent carboxy compound may likewise be substituted or unsubstituted, aromatic or aliphatic, and/or mono- or polyfunctional. Esters which have proven useful include tetrakis(methylene [3,5-di-t-butyl-4-hydroxy-hydrocinnamate])methane, 2,2'oxamido bis(ethyl-3-(3,5-di-t-butyl-4-hydroxyphenyl) propionate, and GOOD-RITE 3125, herein designated a trifunctional hindered phenolic ester compound (see Example 107 for description of structure). Additional esters may be imagined by those skilled in the art.

Suitable alcohol (—OH) stabilizer compounds for use herein may be selected from mono, di-, or polyfunctional hydroxy compounds. Usually, the alcohol will contain from 2 to 50 carbon atoms and can be a straight, branched, cyclic and/or aromatic chain.

Diols and polyols are preferred. By way of illustration, such diols include aliphatic diols, for example, ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexanediol, and the like; alicyclic diols, for example, 1,2-cyclopentanediol, 1,2-cyclohexanediol, and the like; branched acyclic diols, for example, 2,3-dimethyl-2,3-butanediol (pinacol), and the like. Also useful with this method are highly branched polyols as well as alkoxy substituted cyclic or acyclic alkanes. Preferred diols are those in which at least one of the hydroxy functionalities is a tertiary hydroxy, for example, 2,5-dimethyl-2,5-hexanediol and 2-methyl-2,4-pentanediol.

A second preferred class of alcohols is the alkenols. These alcohols may have multiple points of unsaturation with hydroxy substitution occurring on either a saturated or unsaturated carbon. Effective alkenols include 4-methyl-4-penten-2-ol, 3-methyl-penten-3-ol, 2-methyl-4-penten-2-ol, 2,4-dimethyl-4-penten-2-ol, 2-phenyl-4-penten-2-ol, and 9-decen-1-ol.

A third preferred class of alcohols is the tertiary alcohols which contain at least one hydroxy substituted tertiary carbon. Specific such compounds include aliphatic tertiary carbons, such as, 2-methyl -2,4-pentanediol, 2-phenyl-2-propanol, 3-hydroxy-3-methyl-2-butanone, 2-phenyl-2-butanol, etc., and cycloaliphatic tertiary carbons, such as, 1-hydroxy-1-methyl cyclohexane.

A fourth preferred class of alcohols is hydroxy methyl aromatics which are intended to encompass compounds having hydroxy substitution on a saturated carbon attached to an unsaturated carbon in an aromatic ring. Preferably, the aromatic ring is benzene or naphthalene or, of course, a substituted aromatic ring. The hydroxy substituted saturated carbon may be a simple methylol group (—CH$_2$OH) or it may be a member of a more complex hydrocarbon group, such as would be the case with (—CR$^4$HOH) or (—CR$_2^4$OH) wherein $R^4$ is a complex or simple hydrocarbon. Thus, specific hydroxy methyl aromatics may be benzhydrol, 1,3-benzenedimethanol, benzyl alcohol, 4-benzyl oxybenzyl alcohol, and benzyl benzyl alcohol. The preferred conjugated hydroxy contains a benzylic alcohol group.

Thio (>S) compounds suitable for use herein are thiols, thioethers and cyclic thioethers. For example, thiols include 2-mercaptobenzothiazole, etc.; thioethers include dilaurylthiopropionate, etc. and cyclic thioethers include 1,4-dithiane, 1,4,8,11-tetrathiocyclotetradecane, etc. Preferred are the cyclic thioethers, especially cyclic thioethers containing more than one thioether group. A particularly preferred cyclic thioether contains a single intervening carbon between two thioether groups, for example, 1,3-dithiane. Of course, the cyclic ring may contain oxygen or nitrogen members.

Diketone (>CO) compounds useful herein contain two carbonyl functionalities, preferably separated by a single intervening carbon atoms. Suitable diketones include 2,4-pentadione, etc.

Sulfone (—SO$_2$) compounds suitable for use herein are of the general formula $$R^5-SO_2-R^6$$

wherein $R^{5-6}$ may be the same or different and selected from the group alkyl, aryl, alkoxy, aryloxy, etc. and substituted derivatives thereof. At least one of the R groups should be a substituted or unsubstituted benzyl. Specific sulfones suitable for use herein include benzylsulfone.

Suitable alkenes for use herein include alkenes represented by the general formula

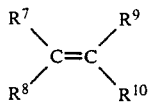

wherein $R^{7-10}$ may be the same or different and may be selected from hydrogen, alkyl, cycloalkyl, alkenyl, cycloalkenyl, aryl, aralkyl, alkaryl, alkoxy, aryloxy and substituted derivatives thereof. A first preferred alkene as shown above is one in which $R^{7-8}$ are independently selected from alkyl, cycloalkyl, alkenyl, cycloalkenyl, aryl, aralkyl, alkaryl, and substituted derivatives thereof. Especially preferred such alkenes are ones in which $R^7$ is selected from the group consisting of aryl, aralkyl, and substituted derivatives thereof. A second preferred alkene as shown above is one wherein at least one of $R^7$ and $R^8$ and at least one of $R^9$ and $R^{10}$ are aryl or aralkyl such as, for example, 1,2-diphenyl ethene. A third preferred alkene is one wherein at least one of $R^{7-10}$ is metharyl, such as for example, allyl phenol. Of course, the $R^{7-10}$ groups can be linked to form cyclic compounds. Useful alkenes are 2,4-dimethyl-1-pentene, limonene, 2-phenyl-2-pentene, 2,4-dimethyl-1-pentene, 1,4-diphenyl-1,3-butadiene, 2-methyl-1-undecene, 1-dodecene.

Suitable hydroaromatic compounds are the partially hydrogenated carbon skeletons of an aromatic system or an aromatic system in combination with an unsaturated ring. Preferred aromatic systems are benzene or naphthalene based systems. Examples of suitable hydroaromatic compounds are indane, 5,6,7,8-tetrahydro-1-naphthol, 5,6,7,8-tetrahydro-2-naphthol, 9,10-dihydroanthracene, 9,10-dihydrophenanthrene, 1-phenyl-1-cyclohexane, 1,2,3,4-tetrahydro-1-naphthol, and others.

Suitable pyran compounds include hydrogenated and nonhydrogenated, substituted and unsubstituted pyran. Substituent groups may be chosen from alkyl, aryl, alkoxy, aryloxy, etc., and may be positioned on any carbon of the pyran ring. Preferably, the substituent group is alkoxy or aryloxy and located on the six position. It is also preferred that the pyran compound be hydrogenated. Representative of the diethers for use herein are dihydropyranyl ethers and tetrahydropyranyl ethers.

Additional compounds which function as stabilizers in the present process are high molecular weight oxamide phenolics, for example, 2,2-oxamido bis-[ethyl 3-(3,5-di-tert-butyl-4-hydroxyphenyl)propionate], high molecular weight oxalic anilides and their derivatives, and amines such as thiourea.

Suitable stabilizing compounds may be a member of more than one of the above described groups. In other words, a single compound may have 2 or more functionalities characteristic of the groups as described above. Of course, each such compound whether having 1, 2, or more functionalities will vary in stabilizing effectiveness and thus, depending on the stabilizing compound chosen, the effective amount of such compound will also change. Generally, it is not desirable to choose a compound that would require more than 5 weight parts per 100 parts by weight resin to achieve the desired degree of stabilization. Ideally, the stabilizing compound should be added in an amount between about 0.01 weight parts and 0.50 weight parts per 100 weight parts resin. Mixtures of stabilizing compounds may also be used.

The admixtures of the aromatic carbonate polymer and stabilizing compound are simply prepared by standard techniques, for example, by simple blending or dry mixing and melt extruding at an elevated temperature. The extruded admixture is then molded into a piece of specific dimensions or further extruded into a film or sheet product.

The radiation employed to achieve sterilization of the particular object is ionizing radiation, usually gamma radiation produced from a cobalt-60 or cesium-137 radioactive nuclei. The quantity of gamma radiation required for sterilization is generally 0.5 to about 7 Megarads. Preferably, the irradiation is from about 1.0 to 3.0 Megarads. A second type of radiation, electron beam radiation, is also suitable for sterilization. Electron beam radiation is produced in a high voltage electron acceleration.

DESCRIPTION OF SPECIFIC EMBODIMENTS

Further illustration of this invention is set forth in the following examples. There is no intention to limit the scope of the invention to merely what is shown.

The following resins were used in the formulations of the examples:

Polycarbonate—LEXAN ® 145 resin, poly(bisphenol-A carbonate), General Electric Company (contains 0.06% by weight of a conventional phosphite stabilizer).

Poly(ester-carbonate)—an ester content of 75% mole % and being 93 mole % isophthalate and 7 mole % terephthalate.

Polycarbonate/polyester blend—80 weight parts polycarbonate with 20 weight parts KODAR A150 resin, Eastman Kodak Company, poly(1,4-cyclohexanedimethanolterephthalate-co-isophthalate) and a phosphorous acid stabilizer.

Unless otherwise noted, the formulations containing 100 weight parts of the indicated resin or blend were extruded on a sterling single screw (1 ¾") extruder at a melt temperature of T1. Test plaques ⅛" in thickness were injection molded on a 3 oz. Van Dorn using a T2 melt set temperature, a T3 mold cavity temperature, and a 10/20 cycle time. T1, T2, and T3 were set according to the resin or blend used:

| Polycarbonte | T1 = 260° C. |
| | T2 = 302° C. |
| | T3 = 82° C. |
| Poly(ester-carbonate) | T1 = 299° C. |
| | T2 = 343° C. |
| | T3 = 116° C. |
| Polycarbonate/Polyester | T1 = 282° C. |
| | T2 = 282° C. |
| | T3 = 66° C. |

The samples were irradiated by one of the following methods:

Gamma Irradiation—samples were exposed to a $Co^{60}$ source on a continuous conveyor system, dosimetry was monitored with a calibrated NBS, radiochromic, nylon dosimeter and different $Co^{60}$ sources were used.

Electron Beam Irradiation—samples irradiated on one side in air using a linear cathode electron beam system, 5 Mrad dose, 20 ft/min line speed, 5 mA beam current, 200 KV terminal voltage, dosimetry monitored with a calibrated NBS, radiochromic, nylon dosimeter.

Unless otherwise noted, testing of the samples has been conducted with gamma radiation and yellowness index, Y.I., measured on a Gardner colorimeter in accordance with ASTM D1925 both before and after radiation. The less change in Y.I. upon irradiation, the more effective the stabilizer.

| EXAMPLE | ADDITIVE | AMOUNT, phr POLYCARBONATE | Y.I. (0 MRAD) | Y.I. (1.5 MRAD) | Y.I. (2.7 MRAD) | Y.I. (5.8 MRAD) |
|---|---|---|---|---|---|---|
| C | None | — | 2.4 | 9.7 | 16.7 | 31.5 |
| 1 | Pentaerythritol | 0.32 | 2.5 | 12.7 | 15.6 | 31.6 |
| 2 | Triphenylmethanol | 0.20 | 18.0 | 18.6 | 23.8 | 37.7 |
| 3 | Neopentyl alcohol | 0.08 | 2.2 | 9.7 | 14.3 | 31.1 |
| 4 | 2,2-dimethyl-1,3-propanediol | 0.09 | 2.1 | 9.6 | 13.7 | 31.9 |
| 5 | Mannitol | 0.16 | 3.3 | 10.4 | 13.2 | 28.3 |
| C | None | — | 2.4 | 10.7 | 17.8 | 36.2 |
| 6 | 1,4-butanediol | 0.08 | 2.3 | 9.6 | 15.5 | 27.6 |
| 7 | 1,4-butanediol | 0.16 | 2.1 | 10.2 | 15.4 | 26.8 |
| 8 | Octadecanol | 0.23 | 2.1 | 9.6 | 16.8 | 33.4 |
| 9 | Octadecanol | 0.46 | 2.0 | 9.4 | 16.4 | 33.5 |
| 10 | Cyclohexanediol | 0.01 | 2.4 | 9.5 | 16.3 | 32.2 |
| 11 | Cyclooctanediol | 0.12 | 2.3 | 9.2 | 16.6 | 30.5 |
| 12 | Cyclodecanol | 0.16 | 2.1 | 10.0 | 18.8 | 35.4 |

| EXAMPLE | ADDITIVE | AMOUNT, phr POLYCARBONATE | Y.I. (0 MRAD) | Y.I. (2.6/2.7 MRAD) | Y.I. (5.4 MRAD) |
|---|---|---|---|---|---|
| C | None | — | 1.9 | 19.2 | 42.5 |
| 13 | 2,4-pentane diol | 0.09 | 1.6 | 14.8 | 38.3 |
| 14 | 2,4-pentane dione | 0.09 | 1.8 | 16.9 | 37.3 |
| 15 | 2,5-dimethyl-2,5-hexanediol | 0.12 | 1.7 | 14.5 | 29.1 |
| 16 | 2-methyl-2,4-pentanediol | 0.10 | 1.6 | 11.4 | 29.0 |
| 17 | 2-methyl-2,4-pentanediol | 0.15 | 2.0 | 10.6 | 25.3 |
| 18* | 2-methyl-2,4-pentanediol | 0.10 | 1.6 | 10.8 | 24.0 |
| 19 | Cyclohexanedimethanol | 0.12 | 1.6 | 16.9 | 42.5 |

*Contains also 0.31 phr tri(hexylene glycol)biborate

| EXAMPLE | ADDITIVE | ADDITIVE, phr POLYCARBONATE | Y.I. (0 MRAD) | Y.I. (3.0 MRAD) | Y.I. (5.5 MRAD) |
|---|---|---|---|---|---|
| C | None | — | 2.2 | 21.6 | 40.3 |
| 20 | 2-methyl-2,4-pentanediol | 0.1 | 1.9 | 11.8 | 26.4 |
| 21 | 2-methyl-2-pentanol | 0.09 | 2.1 | 15.2 | 24.9 |
| 22 | 2-phenyl-2-propanol | 0.12 | 2.0 | 18.6 | 33.9 |
| 23 | 2-phenyl-2-butanol | 0.13 | 2.0 | 15.1 | 25.7 |
| 24 | 1,3-butanediol | 0.08 | 1.9 | 16.3 | 32.7 |

| | ADDITIVE, phr | Y.I. | Y.I. | Y.I. |

-continued

| EXAMPLE | ADDITIVE | ADDITIVE, phr POLYCARBONATE | Y.I. (0 MRAD) | Y.I. (2.6/2.7 MRAD) | Y.I. (5.1/5.6 MRAD) |
|---|---|---|---|---|---|
| C | None | — | 1.9 | 21.9 | 42.4 |
| 25 | 2,3-dimethyl-2,3-butanediol | 0.10 | 1.8 | 19.9 | 40.0 |
| 26 | 3-hydroxy-3-methyl-2-butanone | 0.09 | 1.9 | 20.2 | 34.7 |
| 27 | 4-hydroxy-4-methyl-2-pentanone | 0.10 | 1.9 | 18.9 | 34.5 |
| 28 | 2-methyl-2,4-pentanediol | 0.04 | 1.6 | 15.3 | 30.2 |
| 29 | 2-methyl-2,4-pentanediol | 0.10 | 1.6 | 10.9 | 20.5 |
| 30 | 2-methyl-2,4-pentanediol | 0.40 | 1.5 | 10.6 | 17.3 |

| EXAMPLE | ADDITIVE | ADDITIVE, phr POLYCARBONATE | Y.I. (0 MRAD) | Y.I. (3.0 MRAD) | Y.I. (6.1 MRAD) |
|---|---|---|---|---|---|
| C | None | — | 1.9 | 22.1 | 55.2 |
| 31 | 2-methyl,2,4-pentanediol | 0.10 | 1.6 | 11.5 | 37.3 |
| 32 | 3-ethyl-3-pentanol | 0.10 | 2.2 | 19.8 | 45.5 |
| 33 | 3-ethyl-3-heptanol | 0.12 | 1.5 | 20.7 | 47.6 |
| 34 | 3-ethyl-3-heptanol | 0.25 | 1.5 | 18.6 | 40.1 |
| 35 | 4-methyl-4-nonanol | 0.13 | 1.6 | 19.0 | 42.4 |
| 36 | 2,7-dimethyl-2,7-octanediol | 0.15 | 1.6 | 20.1 | 44.3 |
| C | None | — | 1.8 | 25.0 | 49.1 |
| 37 | 2,4-dimethyl-2,4-pentanediol | 0.11 | 1.7 | 14.1 | 28.9 |
| 38 | 2-methyl-2,4-pentanediol | 0.10 | 1.5 | 11.3 | 30.1 |

| EXAMPLE | ADDITIVE | ADDITIVE, phr POLYCARBONATE | Y.I. (0 MRAD) | Y.I. (5 MRAD)* |
|---|---|---|---|---|
| C | None | — | 1.5 | 4.3 |
| 39 | 2-methyl-2,4-pentanediol | 0.10 | 1.6 | 2.8 |
| 40 | 2,4-pentanediol | 0.09 | 1.6 | 3.4 |
| 41 | 2-methyl-2-pentanol | 0.09 | 1.7 | 3.7 |
| C | None | — | 1.9 | 4.5 |
| 42 | 2,5-dimethyl-2,5-hexanediol | 0.12 | 2.3 | 4.1 |
| C | None | — | 1.7 | 4.5 |
| 43 | 2-methyl-2,4-pentanediol | 0.04 | 1.6 | 3.6 |
| 44 | 2-methyl-2,4-pentanediol | 0.10 | 1.6 | 3.2 |
| 45 | 2-methyl-2,4-pentanediol | 0.40 | 1.5 | 2.7 |

*Electron beam irradiation

| EXAMPLE | ADDITIVE | ADDITIVE, phr POLYCARBONATE/POLYESTER* | Y.I. (0 MRAD) | Y.I. (2.6/2.7 MRAD) | Y.I. (5.3/5.4 MRAD) |
|---|---|---|---|---|---|
| C | None | — | −13.6 | 1.1 | 17.4 |
| 46 | 2-methyl-2,4-pentanediol | 0.10 | −12.9 | −2.0 | 11.9 |

*80/20 weight ratio polycarbonate/polyester and a violet dye

| EXAMPLE | ADDITIVE | ADDITIVE, phr POLY(ESTERCARBONATE) | Y.I. (0 MRAD) | Y.I. (2.9/3.0 MRAD) |
|---|---|---|---|---|
| C | NONE | — | 6.5 | 17.2 |
| 47 | 2-methyl-2,4-pentanediol pentanediol | 0.08 | 6.1 | 12.4 |

| EXAMPLE | ADDITIVE | ADDITIVE, phr POLY(ESTERCARBONATE) | Y.I. (0 MRAD) | Y.I. (5.0 MRAD)* |
|---|---|---|---|---|
| C | None | — | 6.0 | 7.5 |
| 49 | 2-methyl-2,4-pentanediol | 0.12 | 5.1 | 6.1 |

*Electron beam irradiation

| EXAMPLE | ADDITIVE | ADDITIVE, phr POLYCARBONATE | Y.I. (0 MRAD) | Y.I. (2.6/3.0 MRAD) | Y.I. (5.5/4.9 MRAD) |
|---|---|---|---|---|---|
| C | None | — | 2.3 | 24.3 | 45.3 |
| 50 | Benzyl ether | 0.17 | 2.2 | 21.7 | 37.6 |
| 51 | 4-benzyl-oxy-benzyl alcohol | 0.18 | 2.6 | 14.6 | 23.2 |
| 52 | benzyl-benzyl alcohol | 0.17 | 2.4 | 17.7 | 31.3 |
| 53 | Benzyl alcohol | 0.09 | 2.0 | 12.6 | 18.8 |

-continued

| EXAMPLE | ADDITIVE | ADDITIVE, phr POLYCARBONATE | Y.I. (0 MRAD) | Y.I. (3.1 MRAD) | Y.I. (5.5/5.7 MRAD) |
|---|---|---|---|---|---|
| C | None | — | 2.0 | 20.3 | 42.4 |
| 54 | Benzhydrol | 0.16 | 1.9 | 14.3 | 24.3 |

| EXAMPLE | ADDITIVE | ADDITIVE, phr POLYCARBONATE | Y.I. (0 MRAD) | Y.I. (3.3/3.2 MRAD) | Y.I. (5.1/5.0 MRAD) |
|---|---|---|---|---|---|
| C | None | — | 1.9 | 26.7 | 37.4 |
| 55 | 1,2-dimethanol benzene | 0.12 | 3.3 | 22.6 | 26.9 |
| 56 | 1,3-dimethanol benzene | 0.12 | 1.7 | 13.2 | 15.5 |
| 57 | 1,4-dimethanol benzene | 0.12 | 1.6 | 12.9 | 15.1 |

| EXAMPLE | ADDITIVE | ADDITIVE, phr POLYCARBONATE | Y.I. (0 MRAD) | | Y.I. (5.0/5.2 MRAD) |
|---|---|---|---|---|---|
| C | None | — | 2.1 | | 44.0 |
| 58 | 1,3-dimethanol benzene | 0.12 | 1.9 | | 18.6 |
| 59 | 1,3-dimethanol benzene/ 2-methyl-2,4-pentandiol | 0.12/0.10 | 1.8 | | 16.5 |

| EXAMPLE | ADDITIVE | ADDITIVE, phr POLYCARBONATE | Y.I. (0 MRAD) | Y.I. (3.3/3.2 MRAD) | Y.I. (5.1/5.0 MRAD) |
|---|---|---|---|---|---|
| C | None | — | 2.1 | 25.1 | 37.3 |
| 60 | Benayl sulfone | 0.24 | 2.3 | 25.5 | 23.7 |

| EXAMPLE | ADDITIVE | ADDITIVE, phr POLYCARBONATE | Y.I. (0 MRAD) | Y.I. (3 MRAD) | Y.I. (6.1 MRAD) |
|---|---|---|---|---|---|
| C | None | — | 2.7 | 22.6 | 49.5 |
| 61 | Benzyl alcohol | 0.04 | 1.9 | 13.7 | 24.3 |
| 62 | Benzyl alcohol | 0.12 | 1.5 | 11.5 | 18.4 |
| 63 | Benzyl alcohol | 0.20 | 1.6 | 10.7 | 16.3 |
| 64 | Benzyl alcohol | 0.50 | 2.0 | 9.8 | 13.3 |
| 65 | Benzyl alocohol | 1.0 | 7.7 | 9.7 | 11.5 |

| EXAMPLE | ADDITIVE | ADDITIVE, phr POLYCARBONATE | Y.I. (0 MRAD) | | Y.I. (5 MRAD)* |
|---|---|---|---|---|---|
| C | None | — | 1.9 | | 4.5 |
| 66 | Benhydrol | 0.16 | 1.9 | | 3.3 |
| C | None | — | 1.9 | | 4.7 |
| 67 | Benzenedimethanol | 0.12 | 1.7 | | 3.0 |
| C | None | — | 1.8 | | 4.8 |
| 68 | 1,3-benzenedimethanol | 0.12 | 1.7 | | 3.1 |
| 69 | Benzyl alcohol | 0.10 | 1.7 | | 3.1 |
| 70 | Benzyl alcohol | 0.19 | 1.7 | | 3.0 |

*Electron beam irradiation

| EXAMPLE | ADDITIVE | ADDITIVE, phr POLYCARBONATE/ POLYESTER* | Y.I. (0 MRAD) | Y.I. (2.5/2.8 MRAD) | Y.I. (4.9/5.1 MRAD) |
|---|---|---|---|---|---|
| C | None | — | 3.1 | 9.5 | 15.1 |
| 71 | Benzyl alcohol | 0.09 | 5.2 | 9.5 | 12.1 |

*80/20 weight ratio polycarbonate/polyester

| EXAMPLE | ADDITIVE | ADDITIVE, phr POLY(ESTER-CARBONATE | Y.I. (0 MRAD) | Y.I. (2.5/2.8 MRAD) | Y.I. (4.9/5.1 MRAD) |
|---|---|---|---|---|---|
| C | None | — | 4.9 | 15.1 | 21.6 |
| 72 | Benzyl alcohol | 0.09 | 5.0 | 12.7 | 17.0 |
| 73 | Benzyl alcohol | 0.19 | 6.6 | 13.9 | 18.1 |

| EXAMPLE | ADDITIVE | ADDITIVE, phr POLYCARBONATE | Y.I. (0 MRAD) | Y.I. (3.3/3.2 MRAD) | Y.I. (5.1/5.0 MRAD) |
|---|---|---|---|---|---|
| C | None | — | 2.1 | 25.1 | 37.3 |
| 74 | 1,2,3,4-tetrahydro-1-naphthol | 0.13 | 2.3 | 11.6 | 14.3 |
| 75 | 1,2,3,4-tetrahydro-naphthalene | 0.13 | 2.1 | 19.6 | 21.7 |

| EXAMPLE | ADDITIVE | ADDITIVE, phr POLYCARBONATE | Y.I. (0 MRAD) | | Y.I. (5 MRAD)* |
|---|---|---|---|---|---|
| C | None | — | 2.0 | | 4.7 |
| 76 | 1,2,3,4-tetrahydro-1-naphthol | 0.13 | 2.3 | | 2.0 |
| 77 | 1,2,3,4-tetrahydro-naphthalene | 0.11 | 3.6 | | 4.0 |
| C | None | — | 2.4 | | 5.1 |
| 78 | 1-phenyl-cyclohexane | 0.13 | 2.3 | | 3.6 |
| 79 | 5,6,7,8-tetrahydro-2-naphtol | 0.13 | 3.3 | | 4.7 |
| 80 | 9,10-dihydroanth- | 0.15 | 2.1 | | 3.9 |

-continued racene

*Electron beam irradiation

| EXAMPLE | ADDITIVE | ADDITIVE, phr POLY(ESTER CARBONATE) | Y.I. (0 MRAD) | Y.I. (2.5/2.8 MRAD) | Y.I. (4.9/5.1 MRAD) |
|---|---|---|---|---|---|
| C | None | — | 6.6 | 16.8 | 20.9 |
| 81 | 5,6,7,8-tetra-hydro-1-naphthol | 0.15 | 5.4 | 14.9 | 18.9 |

| EXAMPLE | ADDITIVE | ADDITIVE, phr POLYCARBONATE | Y.I. (0 MRAD) | Y.I. (3.1 MRAD) | Y.I. (5.5/5.7 MRAD) |
|---|---|---|---|---|---|
| C | None | — | 2.0 | 20.3 | 42.0 |
| 82 | 1,3-dithiane | 0.10 | 2.4 | 10.3 | 19.9 |
| 83 | 1,4-dithiane | 0.10 | 2.1 | 14.9 | 32.2 |
| 84 | 2,5-diol-1,4-dithiane | 0.13 | 46.7 | 42.8 | 45.4 |
| 85 | 1,4,8,11-tetra-thiocyclo-tetra-decane | 0.23 | 2.4 | 13.1 | 27.6 |
| 86 | Sulfur | 0.22 | 70.8 | 67.6 | 70.3 |

| EXAMPLE | ADDITIVE | ADDITIVE, phr POLYCARBONATE | Y.I. (0 MRAD) | Y.I. (5 MRAD)* |
|---|---|---|---|---|
| C | None | — | 1.9 | 4.5 |
| 87 | 1,3-dithiane | 0.10 | 2.2 | 3.3 |
| 88 | 1,4,8,11-tetrathio-cyclotetradecane | 0.20 | 2.4 | 4.1 |

*Electron beam irradiation

| EXAMPLE | ADDITIVE | ADDITIVE, phr POLYCARBONATE | Y.I. (0 MRAD) | Y.I. (3.0 MRAD) | Y.I. (6.1 MRAD) |
|---|---|---|---|---|---|
| C | None | — | 1.8 | 25.0 | 49.1 |
| 89 | 2,4-dimethyl-1-pentene | 0.08 | 1.7 | 21.7 | 42.1 |
| 90 | 2,4-dimethyl-1-pentene | 0.13 | 1.7 | 21.3 | 43.0 |
| 91 | 4-methyl-4-pentene-2-ol | 0.09 | 1.6 | 11.2 | 26.9 |
| 92 | 4-methyl-4-penten-2-ol | 0.13 | 1.5 | 10.3 | 17.4 |
| 93 | 2-methyl-2-pentene-2-ol | 0.09 | 1.7 | 14.1 | 34.8 |
| 94 | 2-methyl-4-pentene-2-ol | 0.13 | 1.5 | 14.2 | 34.7 |
| 95 | 2,4-dimethyl-4-pentene-2-ol | 0.10 | 1.6 | 15.4 | 33.9 |
| 96 | 2-phenyl-4-pentene-2-ol | 0.14 | 1.7 | 15.9 | 31.5 |
| 97 | 2-phenyl-2-pentene | 0.13 | 1.6 | 12.5 | 21.2 |

| EXAMPLE | ADDITIVE | ADDITIVE, phr POLYCARBONATE | Y.I. (0 MRAD) | Y.I. (5 MRAD)* |
|---|---|---|---|---|
| C | None | — | 1.9 | 4.7 |
| 98 | 3-methyl-pentene-3-ol | 0.09 | 1.6 | 3.2 |

*Electron beam irradiation

| EXAMPLE | ADDITIVE | ADDITIVE, phr POLYCARBONATE | Y.I. (0 MRAD) | Y.I. (3.1/3.2 MRAD) |
|---|---|---|---|---|
| C | None | — | 1.9 | 21.7 |
| 99 | 1,4-diphenyl-1,3-butadiene | .18 | 1.7 | 19.4 |
| 100 | 1-dodecene | 0.15 | 1.6 | 18.3 |
| 101 | trans-stilbene | 0.15 | 2.4 | 16.7 |
| 102 | 2-methyl-undecene | 0.15 | 1.7 | 18.6 |
| 103 | Limonene | 0.12 | 1.9 | 12.4 |
| 104 | Allyl phenol | 0.11 | 2.3 | 16.0 |
| 105 | 9-decen-1-ol | 0.15 | 1.6 | 18.2 |

| EXAMPLE | ADDITIVE | ADDITIVE, phr POLYCARBONATE | Y.I. (0 MRAD) | Y.I. (2.6/3.0 MRAD) | Y.I. (4.9/5.5 MRAD) |
|---|---|---|---|---|---|
| C | None | — | 2.5 | 27.5 | 42.1 |
| 106 | 3,4-dihydro-2-ethoxy-2H-pyran | 0.10 | 4.0 | 12.5 | 17.2 |

EXAMPLES 107-118

The following formulations were extruded at from 271° to 299° C. and injection molded into test plaques ⅛" in thickness using a melt temperature of from 271° to 288° C. and a mold temperature of from 49° to 82° C. Measurement of yellowness index was made on a Pacific-Scientific Spectrogard II unit in accordance with ASTM D1925.

| EXAMPLE | ADDITIVE | AMOUNT, phr POLYCARBONATE | YI$_0$ | RADIATION DOSE (MRAD) | YI$_{final}$ |
|---|---|---|---|---|---|
| C | None | — | 2.7 | 5.0 | 35.2 |
| 107 | Trifunctional hindered phenolic ester[a] | 0.2 | 4.6 | 5.3 | 21.7 |
| 108 | Dilaurylthio-propionate[b] | 0.2 | 3.7 | 5.3 | 22.0 |
| 109 | 1,4-cyclohexane dimethanol | 0.2 | 3.2 | 5.3 | 22.9 |
| 110 | 2,5-dimercapto-1,3,4-thiadiazole[c] | 0.2 | 28.6 | 5.0 | 35.9 |
| 111 | Thiourea | 0.05 | 10.1 | 5.0 | 21.9 |
| 112 | 2-mercapto benzothiazole | 0.5 | 5.3 | 5.3 | 22.6 |
| 113 | 2,2-oxmaido bis(ethyl 3-[3,5-di-tert-butyl-4-hydroxyphenyl]) propionate[e] | 0.2 | 16.8 | 5.2 | 39.7 |
| 114 | Oxalic anilide derivative[f] | 0.2 | 3.1 | 5.0 | 23.0 |
| 115 | Pentaerythritol | 0.2 | 2.4 | 5.0 | 18.1 |
| 116 | Trimethylol propane | 0.2 | 3.1 | 5.0 | 26.2 |
| 117 | Tetrakis(2,4-di-t-butylphenyl)4,4'-biphenylenedi-phophite[g] | 0.1 | 2.0 | 5.0 | 24.0 |
| 118 | Tetrakis(methylene [3,5-di-t-butyl-4-hydroxy-hydrocinna-mate])methane[h] | 0.1 | 2.5 | 2.5 | 16.1 |

EXAMPLE 121

The following composition was extruded from 260° to 316° C. and injection molded into test plaques 1/8" in thickness using a melt temperature of from 260° to 304° C. Measurement of yellowness index was made on a Pacific Scientific Spectrogard II unit in accordance with ASTM D-1925.

| EXAMPLE | C | 121 |
|---|---|---|
| Polycarbonate | 50 | 50 |
| Polyester | 50 | 50 |

| EXAMPLE | | C | 121 |
|---|---|---|---|
| 8V | Trifunctional hindered phenolic ester | — | 0.2 |
| | Mixed red and blue dyes | 0.001 | 0.001 |
| | YI (0 Mrads) | — | — |
| | YI (5 Mrads) | 7.5 | 4.1 |

| EXAMPLE | ADDITIVE | ADDITIVE, phr POLYCARBONATE | Y.I. (0 MRAD) | Y.I. (5.0/5.2 MRAD) |
|---|---|---|---|---|
| C | None | — | 5.1 | 42.4 |
| 122 | 2,2-oxamido bis (ethyl-3-[3,5-di-t-butyl-4-hydroxy-phenyl])propionate* | 0.2 | 0.8** | 24.5** |

*NAUGARD ® XL-1 compound
*Green color formed

| EXAMPLE | ADDITIVE | ADDITIVE, phr POLYCARBONATE | Y.I. (0 MRAD) | Y.I. (2.6/3 MRAD) | Y.I. (5.5/4.9 MRAD) |
|---|---|---|---|---|---|
| C | None | — | 2.3 | 26.1 | 48.9 |
| 123 | trifunctional hindered phe-nolic ester | 0.2 | 1.7 | 15.0* | 34.9* |

*Green color formed

EXAMPLES 129-131

The following formulations were molded in accordance with the conditions of Examples 107-118:

| EXAMPLE | ADDITIVE | ADDITIVE, phr POLYCARBONATE | Y.I. (0 MRAD) | Y.I. (1.5 MRAD) | Y.I. (2.8 MRAD) | Y.I. (6.0 MRAD) |
|---|---|---|---|---|---|---|
| C | None | — | 2.7 | 10.5 | 26.5 | 58.2 |
| 124 | dilaurylthio-propionate* | 0.2 | 6.3 | 13.9 | 26.5 | 50.3 |
| 125 | oxalic anilide derivative*° | 0.2 | 2.9 | 10.7 | 25.4 | 51.1 |
| 126 | tetrakis(2,4- | 0.2 | 3.4 | 11.9 | 27.6 | 54.5 |

| EXAMPLE | ADDITIVE | ADDITIVE, phr POLYCARBONATE | Y.I. (0 MRAD) | Y.I. (1.5 MRAD) | Y.I. (2.8 MRAD) | Y.I. (6.0 MRAD) |
|---|---|---|---|---|---|---|
| | di-t-butylphenyl)-4,4-biphenylene-diphosphite | | | | | |

*CYANOX ® LTDP compound
**SANDUVOR ® VSU compound
***SANDOSTAB ® PEPQ compound

What is claimed is:

1. A method for sterilizing an aromatic carbonate polymer, said method comprising:
   (i) imparting enhanced stability against sterilizing radiation to an aromatic carbonate polymer by admixing therewith an effective amount of a diketone compound effective to inhibit yellowing upon exposure to sterilizing radiation, said diketone being 2-4 pentanedione, and
   (ii) exposing said aromatic carbonate polymer to sterilizing radiation.

* * * * *